(12) United States Patent
Loupos et al.

(10) Patent No.: US 11,481,716 B2
(45) Date of Patent: Oct. 25, 2022

(54) ROUTE AUDITING FOR PHYSICAL INTERNET CONTAINER ROUTING

(71) Applicant: Inlecom Group BVBA, Brussels (BE)

(72) Inventors: Konstantinos Loupos, Athens (GR); Patrick J. O'Sullivan, Dublin (IE); Antonios Mygiakis, Chalandri (GR); Panayotis Katsoulakos, Campello (ES); Gerasimos Kouloumpis, Ntrafi-Pikermi (GR); Zisis Palaskas, Athens (GR)

(73) Assignee: INLECOM GROUP BVBA, Brussels (BE)

( * ) Notice: Subject to any disclaimer, the term of this patent is extended or adjusted under 35 U.S.C. 154(b) by 225 days.

(21) Appl. No.: 16/898,407

(22) Filed: Jun. 10, 2020

(65) Prior Publication Data

US 2021/0390501 A1 Dec. 16, 2021

(51) Int. Cl.
*G06Q 10/08* (2012.01)
*G01C 21/34* (2006.01)
(Continued)

(52) U.S. Cl.
CPC ..... *G06Q 10/0833* (2013.01); *G01C 21/3415* (2013.01); *H04W 4/029* (2018.02); *H04W 4/35* (2018.02)

(58) Field of Classification Search
CPC .......... G06Q 10/0833; G01C 21/3415; H04W 4/029; H04W 4/35; H04W 4/023
See application file for complete search history.

(56) References Cited

U.S. PATENT DOCUMENTS 6,255,942 B1 * 7/2001 Knudsen ................... H04Q 9/00
340/539.22
6,643,608 B1 * 11/2003 Hershey ................. G06Q 10/08
702/56

(Continued)

OTHER PUBLICATIONS

Business Requirements Specification (BRS) for Smart Containers. UN/CEFACT. Retrieved from <https://unece.org/DAM/cefact/brs/BRS-SmartContainer_v1.0.pdf>. Sep. 2019. (Year: 2019).*

(Continued)

*Primary Examiner* — Nathan A Mitchell
(74) *Attorney, Agent, or Firm* — CRGO Global; Steven M. Greenberg

(57) ABSTRACT

The self-audited routing of a shipping container includes acquiring a contemporaneous location of a shipping container within location based circuitry of a computing device affixed to the shipping container and retrieving from memory of the computing device affixed to the shipping container, an expected node and a destination node from a sequence of nodes in a path from an origin node of the shipping container, to the destination node. The contemporaneous location is then compared to a location of the expected node and, on the condition that the contemporaneous location is not within a threshold distance of the location of the expected node, a message is transmitted from the computing device over a wireless computer communications network to a remotely disposed client computer indicating a fault in routing of the shipping container to the destination node.

15 Claims, 2 Drawing Sheets

(51) Int. Cl.
H04W 4/35 (2018.01)
H04W 4/029 (2018.01)

(56) References Cited

U.S. PATENT DOCUMENTS

| | | | | |
|---|---|---|---|---|
| 9,020,536 | B1* | 4/2015 | Crossno | G06Q 10/0833 |
| | | | | 455/67.11 |
| 2004/0041706 | A1 | 3/2004 | Stratmoen et al. | |
| 2006/0109106 | A1* | 5/2006 | Braun | G06Q 10/08 |
| | | | | 340/539.13 |
| 2006/0192673 | A1* | 8/2006 | Irwin | G06Q 10/08 |
| | | | | 340/539.22 |
| 2006/0200560 | A1* | 9/2006 | Waugh | G06Q 10/08 |
| | | | | 709/224 |
| 2008/0174485 | A1* | 7/2008 | Carani | G06Q 10/08 |
| | | | | 342/357.46 |
| 2009/0026263 | A1* | 1/2009 | Schmid | G06Q 10/087 |
| | | | | 340/10.1 |
| 2012/0235791 | A1* | 9/2012 | Donlan | G06Q 10/0833 |
| | | | | 340/10.1 |
| 2013/0000362 | A1* | 1/2013 | Bae | E05B 39/005 |
| | | | | 70/57.1 |
| 2013/0154829 | A1* | 6/2013 | Mostov | G08B 25/08 |
| | | | | 248/213.2 |
| 2013/0342343 | A1* | 12/2013 | Harring | H04L 63/102 |
| | | | | 340/521 |
| 2015/0046364 | A1* | 2/2015 | Kriss | G06Q 10/0833 |
| | | | | 705/333 |
| 2015/0262123 | A1* | 9/2015 | Sharma | G06Q 10/0833 |
| | | | | 705/333 |
| 2016/0012391 | A1* | 1/2016 | Burnett | G06Q 10/0832 |
| | | | | 705/336 |
| 2016/0260059 | A1* | 9/2016 | Benjamin | H04W 4/027 |
| 2016/0379165 | A1* | 12/2016 | Moakley | G06Q 10/0833 |
| | | | | 705/333 |
| 2018/0041983 | A1* | 2/2018 | Mulaosmanovic | H04W 4/029 |
| 2018/0341911 | A1* | 11/2018 | Daoura | G06Q 10/0833 |
| 2019/0066042 | A1* | 2/2019 | Conlon | H04W 4/029 |
| 2019/0236165 | A1* | 8/2019 | Nickerson | G06Q 10/08 |
| 2019/0392385 | A1* | 12/2019 | Holatz | H04W 4/02 |
| 2020/0051015 | A1* | 2/2020 | Davis | G06Q 10/0833 |
| 2020/0334631 | A1* | 10/2020 | Conlon | G08B 25/08 |
| 2020/0349496 | A1* | 11/2020 | Irwin | G06Q 10/0631 |

OTHER PUBLICATIONS

F. Reclus and K. Drouard, "Geofencing for fleet & freight management," 2009 9th International Conference on Intelligent Transport Systems Telecommunications, (ITST), 2009, pp. 353-356. (Year: 2009).*

R. J. Craddock and E. V. Stansfield, "Sensor fusion for smart containers," The IEE Seminar on Signal Processing Solutions for Homeland Security, 2005. (Ref. No. 2005/11108), 2005. (Year: 2005).*

Montreuil, et al., "Toward a Physical Internet: Meeting the Global Logistics Sustainability . . . ," Logistics Research, Springer Berlin Heidelberg, vol. 3, No. 2, Feb. 12, 2011.

Sallez, et al., "On the Activeness of Intelligent Physical Internet Containers," Computers in Industry, Elsevier, Amsterdam, NL, vol. 81, Jan. 21, 2016.

Gontara, et al., "Routing the Pi-Containers in the Physical Internet Using the Pi-BGP Protocol," 2018 IEEE/ACS 15th Intern Conf. on Comp Syst and Applications, Oct. 28, 2018.

* cited by examiner

ROUTE AUDITING FOR PHYSICAL INTERNET CONTAINER ROUTING

BACKGROUND OF THE INVENTION

Field of the Invention

The present invention relates to the field of freight transport in a supply chain and more particularly to dynamically routing freight within the supply chain.

Description of the Related Art

A supply chain is a network between a company and its suppliers to produce and distribute a specific product, and the supply chain represents the steps it takes to get the product or service to the customer. Supply chain management is a crucial process because an optimized supply chain results in lower costs and a faster production cycle. Business logistics management refers to the production and distribution process within the company, while supply chain management includes suppliers, manufacturers, logistics and transportation companies and retailers that distribute the product to the end customer. Supply chains include every business that comes in contact with a particular product, including companies that assemble and deliver parts to the manufacturer.

Part and parcel of the integrated supply chain is the effective routing of a shipping container, from an origin to a destination. Typically, a route for transporting a shipping container accounts for the shortest geographic path to the destination so as to affect the delivery of the shipping container by a requested delivery date, subject to the limitation of cost. Obviously, longer paths or longer times in transit are tolerated in exchange for a cheaper cost of transport. But, despite the very best of intentions during planning, different external factors may influence the ability of the shipping container to effectively traverse the selected route so as to meet the requested delivery date. In that instance, when possible, greater costs are incurred to re-route the shipping container along a different path using a different mode of transport so as to recover from the event giving rise to the unexpected delay. However, more often than not, increased costs are not possible and the shipping container arrives at the destination late, potentially disrupting an associated supply chain.

Much of the failings of the conventional mode of container route selection result from the inflexible and non-uniform way in which routes are selected for a container. In the end, it is a centralized scheduling entity that selects the route, a priori, negotiates the contracts necessary to secure the routing and initiates the transport of the shipping container from the point of origin to the destination. When recovery from a fault in routing is required, it is this same centralized entity that seeks to execute the recovery through a re-negotiation of existing contracts, the negotiation of new contracts and the re-initiation of transport of the shipping container from its contemporaneous position along a new route towards the destination. Recognizing this inflexibility, modern thought-leaders in the field of logistics have proposed the notion of the Physical Internet.

In supply chain logistics, the Physical Internet or "PI" is an open global logistics system founded on physical, digital, and operational interconnectivity, through encapsulation, interfaces and protocols. More than a decade ago, Professor Benoit Montreuil, a professor in the department of operations and decision systems at the Universite Laval in Quebec and a member of the College-Industry Council on Material Handling Education (CICMHE) conceived of PI as an improvement to distribution and logistics by applying some of the principles of the digital Internet to the physical movement of goods. To that end, the Physical Internet centers around the basic notion that a shipping container, as a package encapsulator, behaves like packets of the well-known Internet Protocol (IP) of the digital Internet, and moves from an origin to a destination along a route according to transport directives akin to the transport control protocol (TCP) of the digital Internet.

In the Physical Internet, the routing of a shipping container is performed in real-time as the container traverses from node to node on a path from an origin to a destination. The path generally is determined at the outset by a centralized administrator, and, during the transport of the container, the administrator may recompute the path to account for unplanned exigencies, such as weather or construction. As such, the model for container routing and re-routing strays from the pure principal of the Physical Internet wherein, like its digital counterpart, the container should establish its own path and coordinate fault handling and re-routing with the intervention of a centralized administrator.

BRIEF SUMMARY OF THE INVENTION

Embodiments of the present invention address deficiencies of the art in respect to shipping container routing for the Physical Internet and provide a novel and non-obvious method, system and computer program product for self-audited routing of a shipping container. In an embodiment of the invention, a method for self-audited routing of a shipping container includes acquiring a contemporaneous location of a shipping container within location based circuitry of a computing device affixed to the shipping container. The location based circuitry can be global positioning system (GPS) circuitry, circuitry enabled to detect through short range wireless communications, a location beacon of known coordinates or location, or the location based circuitry can include a computer adapted to query over a computer communications network, a location of a nearest router routing communications from the computer so as to estimate a location of the shipping container.

The method also includes retrieving from memory of the computing device, an expected node and a destination node from a sequence of nodes that are in a path from an origin node of the shipping container to the destination node. The method then compares the contemporaneous location to a location of the expected node and, on the condition that the contemporaneous location is not within a threshold distance of the location of the expected node, transmits a message from the computing device over a wireless computer communications network to a remotely disposed client computer indicating a fault in routing of the shipping container to the destination node.

In one aspect of the embodiment, the method additionally includes, on the condition that the contemporaneous location is not with the threshold distance of the location of the expected node, querying a datastore of known nodes with the contemporaneous location, receiving in response to the querying a corresponding node, computing a path of one or nodes from the corresponding node to the destination node, storing a next one of the nodes of the path as a next expected node in the memory of the computing device, and including in the message an indication of a re-routing of the shipping container along the computed path. Optionally, the message can include a request to re-route the shipping container along the computed path. In this instance, the next one of the nodes in the path is stored as the next expected node only upon receiving a response to the message indicating an approval of the re-routing.

In another aspect of the embodiment, the method additionally includes, on the condition that the contemporaneous location is not with the threshold distance of the location of the expected node, querying a datastore of known nodes with the contemporaneous location, receiving in response to the querying a corresponding node, computing a path of one or nodes from the corresponding node to the destination node, computing in the memory of the computing device, a time when the shipping container will arrive at the destination node utilizing the computed path. On the further condition that that the determined time is within a threshold value of a pre-specified time of arrival of the shipping container stored in the memory of the computing device affixed to the shipping container, the method yet further includes storing a next one of the nodes of the path as a next expected node in the memory of the computing device, and including in the message an indication of a re-routing of the shipping container along the computed path.

In yet another aspect of the embodiment, the method further includes, on the condition that the contemporaneous location is not within the threshold distance of the location of the expected node, querying a datastore of known nodes with the contemporaneous location, and receiving in response to the querying a corresponding node. Then, on the further condition that the contemporaneous location is not within the threshold distance of the location of the corresponding node, the method additionally includes storing a most recent node at which the shipping container had been positioned as a next expected node in the memory of the computing device and including in the message an indication of a re-routing of the shipping container to return to the most recent node.

In even yet another aspect of the embodiment, on condition that the contemporaneous location is within a threshold distance of the location of the expected node and the expected node is the destination node, a message may be transmitted from the computing device over a wireless computer communications network to a remotely disposed computing client indicating a completion of the routing of the shipping container to the destination node. Optionally, the message may include an indication of the completion of the routing, a list of each node through which the container had passed from the origin node to the destination node and an amount of time during which the container had been present at each of the nodes in the log.

In another embodiment of the invention, a data processing system is configured for self-audited routing of a shipping container. The system includes a host computing device adapted for affixation to a shipping container. In this regard, the device includes at least one processor, memory and wireless communications circuitry and is communicatively coupled to a route self-auditing module which may be stored in the memory or remotely disposed from the shipping container. The module includes computer program instructions that, during execution in the host computing device, acquire a contemporaneous location of a shipping container within location based circuitry of a computing device affixed to the shipping container, retrieve from memory of the computing device affixed to the shipping container, an expected node and a destination node from a sequence of nodes in a path from an origin node of the shipping container, to the destination node, compare in the memory of the computing device, the contemporaneous location to a location of the expected node and, on the condition that the contemporaneous location is not within a threshold distance of the location of the expected node, transmit a message from the computing device over a wireless computer communications network to a remotely disposed client computer indicating a fault in routing of the shipping container to the destination node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for self-audited container routing and re-routing. In accordance with an embodiment of the invention, a shipping container is instrumented with a computing device hosting a computer program adapted to perform self-audited container routing of the shipping container. In this regard, a route is stored in the computing device including an origin node, a destination node and a number of intermediate nodes en route from the origin node to the destination node. A current node is recorded in the computing device along with a next node to which the shipping container is to travel. Upon receiving a directive to initiate self-auditing, a current location of the computing device is determined and a known location of the next node also is determined. The determined locations are compared to one another and to the extent that the current location is beyond a threshold distance of the known location of the next node, the computing device transmits a message to a remotely disposed client computer indicating a fault condition in routing of the container.

In response to the determination of a fault condition in the routing of the shipping container, the computing device then queries a data store of known nodes in order to location a node nearest to the current location. To the extent that the query returns a new node within a threshold distance of the current location, the computing device computes a new path from the new node to the destination node. Insofar as the new path permits an arrival at the destination node within a timeframe recorded in the computing device, the new path is recorded in the computing device as the route and the new route is included in the message to the administrator.

However, if the new path does not permit arrival at the destination node within the recorded timeframe, or if no new node is found to be proximate to the current location, a new route is established leading to the current node so as to return the container to the node from whence it came. The new route is then also included in the message to the administrator. In this way, the shipping container self-audits its own route and self-corrects fault conditions with new routings without requiring centralized administrator input from afar.

Figure 1:
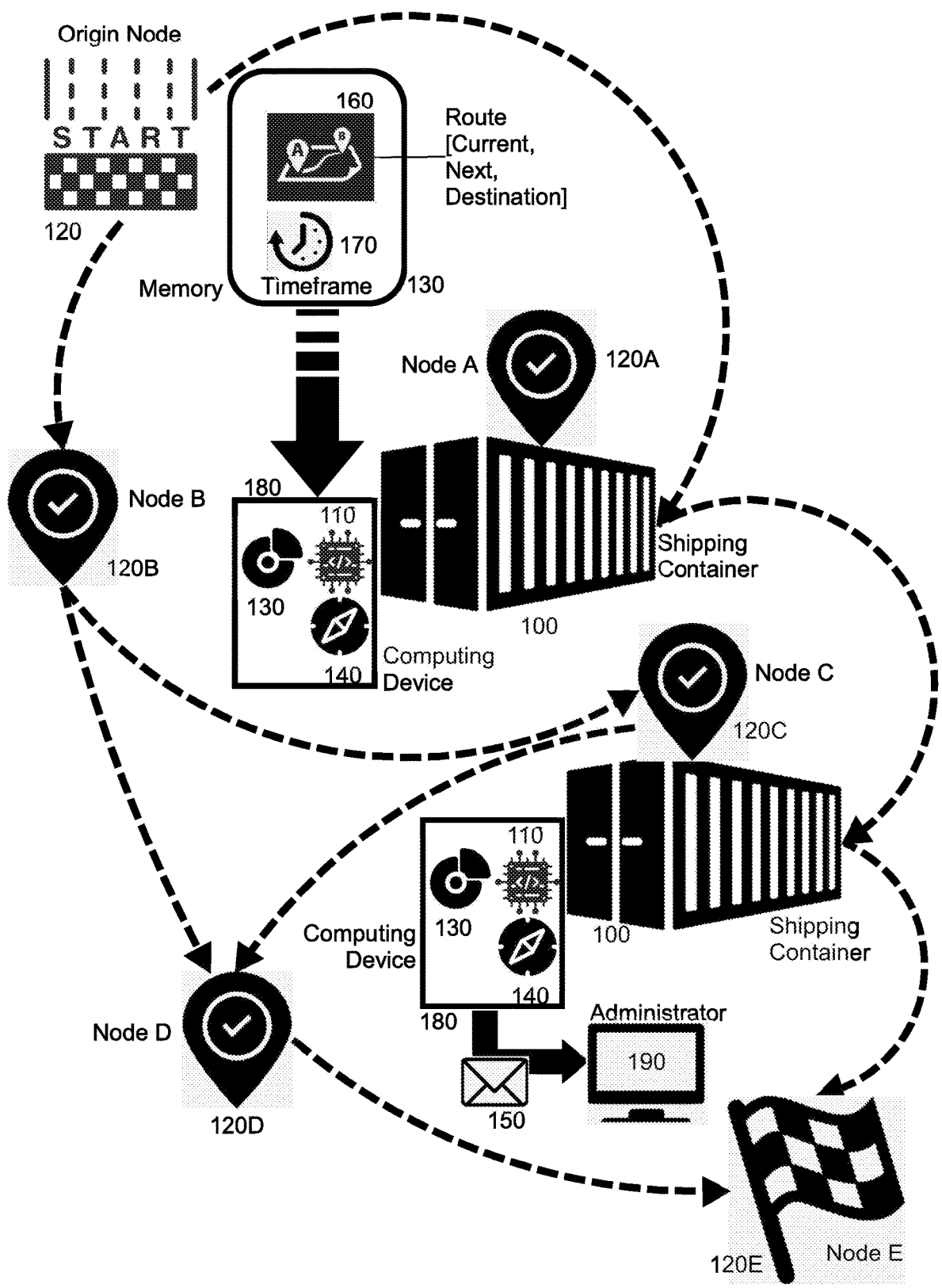
FIG. 1 is a pictorial illustration of a process of self-audited container routing.

In further illustration, FIG. 1 pictorially shows a process of self-audited container routing. As shown in FIG. 1, a route 160 for a shipping container 100 from an origin node 120 to a destination node 120E though a set of intermediate nodes 120A, 120C may be recorded in memory 130 of a computing device 180 affixed to the shipping container 100 and also including a processor 110 executing computer program instructions for the self-auditing of the shipping container 100, and a geolocator 140 adapted to determine a contemporaneous location of the shipping container 100. As well, a timeframe 170 within which the shipping container 100 is required to arrive at the destination node 120E is included in the stored data 130. The route 160 includes an indication of the origin node 120, a current one of the nodes 120A, 120B, 120C, 120D of the route 160 at which the shipping container 100 had been last located, a next one of the nodes 120A, 120B, 120C, 120D of the route 160 to which the shipping container 100 is expected to travel, and of course, an indication of the destination node 120E.

The processor 110 of the computing device 180 initiates self-auditing of the route 160, for instance in response to a manual triggering of the self-auditing, or in response to a pre-determined time interval, or when entering or exiting a geo-fenced zone, to name a few examples. The self-auditing includes retrieving from the memory 130 the current location of the shipping container 100 and the next one of the nodes 120A, 120B, 120C, 120D of the shipping container 100, along with the timeframe 170. The self-auditing then includes retrieving a known location of the next one of the nodes 120A, 120B, 120C, 120D in the route 160 and determining whether or not the shipping container 100 is located within proximity to the next one of the nodes 120A, 120B, 120C, 120D of the route 160. If so, a fault condition for the shipping container 100 is set to false and a message 150 is transmitted to a remotely disposed client computer 190 indicating an as expected transport of the shipping container 100 towards the destination node 120E.

In contrast, in the event that the self-auditing by the processor 110 of the computing device 180 determines that the current location is not within a threshold proximity of the known location of the next one of the nodes 120A, 120B, 120C, 120D, the fault condition is set to true and a message 150 is formulated indicating the current location of the shipping container 100 and the fault condition. Optionally, the processor 110 may query a data store of the nodes 120A, 120B, 120C, 120D either remotely or within the memory of the computing device 180 in order to identify a new one of the nodes 120A, 120B, 120C, 120D nearest to the current location and within proximity of the current location. If none can be found by the processor 110, the processor 110 sets the next one of the nodes 120A, 120B, 120C, 120D set forth in the stored data 130 to the current node and included in the message 150 to the remotely disposed client computer 190.

On the other hand, in the event that the processor 110 is able to retrieve from the query a new one of the nodes 120A, 120B, 120C, 120D within a threshold proximity of the current location, the current location of the stored data 130 is set to the new one of the nodes 120A, 120B, 120C, 120D and a new path to the destination node 120E computed. To the extent that the processor determines that utilizing the new path, the shipping container 100 will arrive at the destination node 120E within the timeframe 170, the processor 110 changes the next node to a next one of the nodes 120A, 120B, 120C, 120D in the path and the processor 110 includes in the message 150 to the administrator 190 an indication of the new path as the new route 160 in response to the fault condition also present in the message 150. But otherwise, the processor 110 sets the next one of the nodes 120A, 120B, 120C, 120D set forth in the stored data 130 to the current node and included in the message 150 to the remotely disposed client computer 190.

Figure 2:
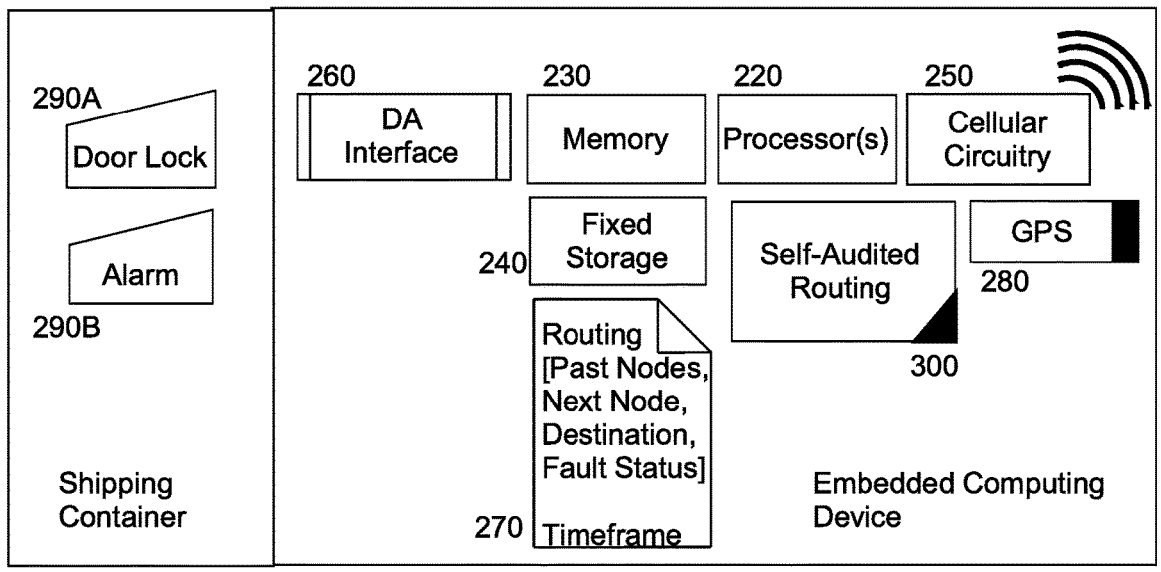
FIG. 2 is a schematic illustration of a data processing system adapted for self-audited container routing; and, FIG. 3 is a flow chart illustrating a process for self-audited container routing and re-routing.

The process described in connection with FIG. 1 may be implemented in a data processing system. In further illustration, FIG. 2 schematically shows a data processing system adapted for self-audited container routing. The system includes an embedded computing device 200 affixed to a shipping container 210. The embedded computing device 200 includes one or more processors 220, memory 230 and fixed storage 240. A routing 270 for the shipping container 210 is stored in the fixed storage 240 and specifies a sequence of nodes in a route to a destination node, nodes previously traversed, a current node at which the shipping container 210 is last located, and a next expected node in the route to the destination node. As well, the routing 270 includes a fault status indicating whether or not the shipping container 210 is determined to have strayed from the route to the destination node specified by the routing 270, and a timeframe by which the shipping container 210 is expected to arrive at the destination node.

The embedded computing device 200 also includes cellular telephony circuitry 250 permitting wireless data communications, a digital to analog interface 260 permitting the control by the one or more processors of analog devices positioned on the shipping container 210 such as a door lock 290A or alarm 290B. The embedded computing device 200 additionally includes GPS circuitry 280. Optionally, the embedded computing device 200 is coupled to a camera (not shown) adapted to acquire imagery of a door to the shipping container 210. Finally, the embedded computing device 200 includes a self-audited routing module 300. The self-audited module 300 includes computer program instructions that, when executing by the one or more processors 220, are enabled to trigger a self-audit of the routing of the shipping container 210 from within a computing device 200 affixed to the shipping container 210.

The self-audit includes acquiring by way of the GPS circuitry 280, a current location of the shipping container 210 and comparing the acquired location to a location of the expected next node in the routing 270 in order to determine whether or not the shipping container 210 is positioned within a threshold distance of the expected next node of the routing 270. If so, the self-audit includes setting the fault value of the routing 270 to false and transmitting a message through the cellular circuitry 250 including the routing 270 to a remotely disposed client computing device. But, otherwise, the self-audit includes setting the fault value of the routine 270 to true and transmitting the message through the cellular circuitry 250 including the routing 270.

To the extent that the self-audit determines a fault in the routing 270, the self-audit additionally queries a set of nodes in a data store with the current position in order to determine if a different node is within a threshold distance of the container 210. If so, the self-audit can attempt to compute a path from the different, new node to the destination node so as to permit the shipping container 210 to arrive at the destination node within the timeframe set forth in the routing 270. If so, the self-audit can write the new node as the current node in the routing 270 and the self-audit can write a next node from the new node as the next expected node in the routing 270. Finally, the self-audit can include the routing 270 in the message to the remotely disposed client computer so that an administrator accessing the remotely disposed client computer, or programmatic logic executing in the remotely disposed client computer has an awareness of the change in routing performed by the shipping container 210.

On the other hand, the self-audit may determine either that no nodes are within a threshold distance of the shipping container 210, or that the new node lacks a suitable path to the destination node so as to permit the shipping container 210 to arrive at the destination node within the timeframe. In either instance, the self-audit sets the expected next node to the current node—the node from which the container had last confirmed location without fault. The self-audit then transmits the message with the routing 270 to the remotely disposed client computer indicating the requirement that the shipping container 210 return to the most recently visited node.

Figure 3:
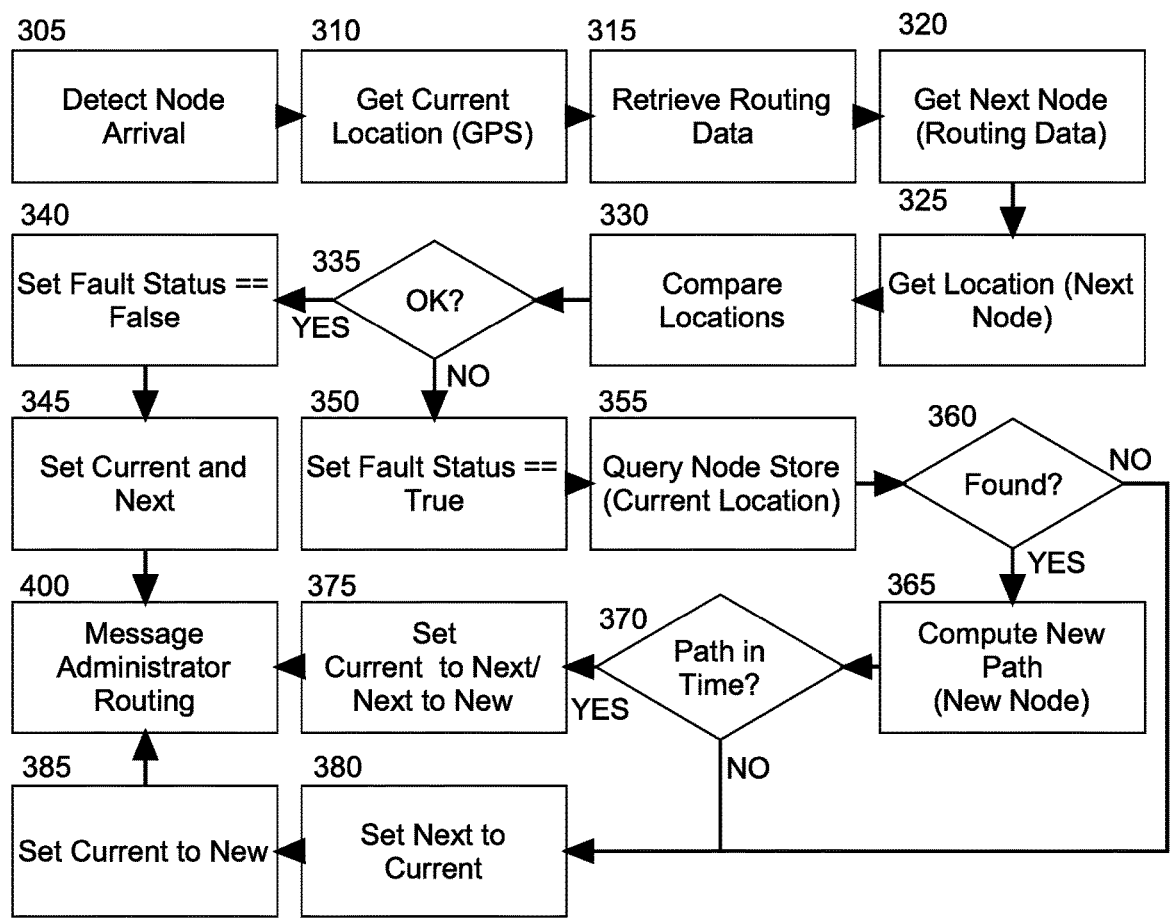

In even yet further illustration of the operation of the self-audited routing module 300, FIG. 3 is a flow chart illustrating a process for self-audited container routing and re-routing. Beginning in block 305, a node arrival triggers a self-auditing process. In block 310, a current location is determined, for instance through a query to a GPS unit. In block 315, routing data for the shipping container is loaded from persistent storage and in block 320, a next expected node is retrieved from the routing data. In block 325, a known location of the next expected node is also retrieved and in block 330, the locations are then compared to one another. In decision block 335, to the extent that the current location is determined to be within a threshold distance of the known location of the next expected node, in block 340 the fault status in the routing data is set to false, a next expected node in the routing data is set to a next node from the next expected node in block 345 and in block 400, the routing data is transmitted wirelessly over a computer communications network to a remotely disposed computing device.

In decision block 335, on the other hand, if the current location is determined not to be within a threshold distance of the known location, thereby indicating that the shipping container has not arrived at the expected next node, in block 350 the fault status in the routing data is set to true and in block 355, a data store of known nodes is queries with the current location in order to identify a node that is proximate to the current location within a threshold distance indicating that the shipping container has arrived at a new, different node other than the expected next node. In decision block 360, if such is the case, then in block 365 a new path of nodes from the new, different node to the destination node is computed and in decision block 370, it is determined if such a path is able to be computed and if so, if the shipping container having taken the new path still will arrive at the destination node within the timeframe expressed in the routing.

In decision block 370, if it is determined both that such a path is able to be computed and that the shipping container having taken the new path still will arrive at the destination node within the timeframe expressed in the routing, then in block 375 the current node is set to the new, different node and the next expected node is set to the node next in sequence from the new, different node according to the new path. However, in decision block 370, if it is determined either that such a path is unable to be computed or that the shipping container having taken the new path will not arrive at the destination node within the timeframe expressed in the routing (or if no node is determined to have been in proximity of the current location as determined in decision block 360), then in block 380 the next expected node is set to the current node and the current node is either set to the null set if no node is determined to have been in proximity to the current location, or to the new, different node if it is determined that the shipping container having taken the new path will fail to arrive at the destination node within the timeframe expressed in the routing. Finally, the routing data is transmitted to the remotely disposed client computer so that the administrator operating the remotely disposed client computer or program logic executing in the remotely disposed client computer maintains an awareness of the self-audit re-routing of the shipping container.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for self-audited routing of a shipping container comprising:
   acquiring a contemporaneous location of a shipping container within location based circuitry of a computing device affixed to the shipping container;
   retrieving from memory of the computing device affixed to the shipping container, an expected node and a destination node from a sequence of nodes in a path from an origin node of the shipping container, to the destination node;
   comparing in the memory of the computing device, the contemporaneous location to a location of the expected node;
   on condition that the contemporaneous location is not within a threshold distance of the location of the expected node, transmitting a message from the computing device over a wireless computer communications network to a remotely disposed computing client indicating a fault in routing of the shipping container to the destination node, querying a datastore of known nodes with the contemporaneous location, receiving in response to the querying an indication of a corresponding node, computing a path of one or more nodes from the corresponding node to the destination node, storing a next one of the nodes of the path as a next expected node in the memory of the computing device, and including in the message an indication of a re-routing of the shipping container along the computed path.

2. The method of claim 1, further comprising:
   computing in the memory of the computing device, a time when the shipping container will arrive at the destination node utilizing the computed path, and
   performing the re-routing on further condition that that the determined time is within a threshold value of a pre-specified time of arrival of the shipping container stored in the memory of the computing device affixed to the shipping container.

3. The method of claim 1, further comprising:
   wherein the corresponding node is a most recent node at which the shipping container had been positioned as a next expected node in the memory of the computing device and including in the message an indication of a re-routing of the shipping container to return to the most recent node.

4. The method of claim 1, further comprising, on condition that the contemporaneous location is within a threshold distance of the location of the expected node and the expected node is the destination node, transmitting a message from the computing device over a wireless computer communications network to a remotely disposed computing client indicating a completion of the routing of the shipping container to the destination node.

5. The method of claim 4, further comprising, including in the message indicating the completion of the routing, a list of each node through which the container had passed from the origin node to the destination node and an amount of time during which the container had been present at each of the nodes in the log.

6. A data processing system configured for self-audited routing of a shipping container, the system comprising:
   a host computing device adapted for affixation to a shipping container, the device comprising at least one processor, memory and wireless communications circuitry; and,
   a route self-auditing module comprising computer program instructions that, during execution in the host computing device perform:
   acquiring a contemporaneous location of a shipping container within location based circuitry of a computing device affixed to the shipping container;
   retrieving from memory of the computing device affixed to the shipping container, an expected node and a destination node from a sequence of nodes in a path from an origin node of the shipping container, to the destination node;

comparing in the memory of the computing device, the contemporaneous location to a location of the expected node; and, on condition that the contemporaneous location is not within a threshold distance of the location of the expected node, transmitting a message from the computing device over a wireless computer communications network to a remotely disposed computing client indicating a fault in routing of the shipping container to the destination node, querying a datastore of known nodes with the contemporaneous location, receiving in response to the querying an indication of a corresponding node, computing a path of one or more nodes from the corresponding node to the destination node, storing a next one of the nodes of the path as a next expected node in the memory of the computing device, and including in the message an indication of a re-routing of the shipping container along the computed path.

7. The system of claim 6, wherein the program instructions further perform:

computing in the memory of the computing device, a time when the shipping container will arrive at the destination node utilizing the computed path, and performing the re-routing on further condition that that the determined time is within a threshold value of a pre-specified time of arrival of the shipping container stored in the memory of the computing device affixed to the shipping container.

8. The system of claim 6, wherein the program instructions further perform:

wherein the corresponding node is a most recent node at which the shipping container had been positioned as a next expected node in the memory of the computing device and including in the message an indication of a re-routing of the shipping container to return to the most recent node.

9. The system of claim 6, wherein the program instructions further perform, on condition that the contemporaneous location is within a threshold distance of the location of the expected node and the expected node is the destination node, transmitting a message from the computing device over a wireless computer communications network to a remotely disposed computing client indicating a completion of the routing of the shipping container to the destination node.

10. The system of claim 9, wherein the program instructions further perform, including in the message indicating the completion of the routing, a list of each node through which the container had passed from the origin node to the destination node and an amount of time during which the container had been present at each of the nodes in the log.

11. A computer program product for self-audited routing of a shipping container, the computer program product including a non-transitory computer readable storage medium having program instructions embodied therewith, the program instructions executable by a device to cause the device to perform a method including:

acquiring a contemporaneous location of a shipping container within location based circuitry of a computing device affixed to the shipping container;

retrieving from memory of the computing device affixed to the shipping container, an expected node and a destination node from a sequence of nodes in a path from an origin node of the shipping container, to the destination node;

comparing in the memory of the computing device, the contemporaneous location to a location of the expected node; and, on condition that the contemporaneous location is not within a threshold distance of the location of the expected node, transmitting a message from the computing device over a wireless computer communications network to a remotely disposed computing client indicating a fault in routing of the shipping container to the destination node, querying a datastore of known nodes with the contemporaneous location, receiving in response to the querying an indication of a corresponding node, computing a path of one or more nodes from the corresponding node to the destination node, storing a next one of the nodes of the path as a next expected node in the memory of the computing device, and including in the message an indication of a re-routing of the shipping container along the computed path.

12. The computer program product of claim 11, wherein the method further includes:

computing in the memory of the computing device, a time when the shipping container will arrive at the destination node utilizing the computed path, and performing the re-routing on further condition that that the determined time is within a threshold value of a pre-specified time of arrival of the shipping container stored in the memory of the computing device affixed to the shipping container.

13. The computer program product of claim 11, wherein the method further includes:

wherein the corresponding node is a most recent node at which the shipping container had been positioned as a next expected node in the memory of the computing device and including in the message an indication of a re-routing of the shipping container to return to the most recent node.

14. The computer program product of claim 11, wherein the method further includes, on condition that the contemporaneous location is within a threshold distance of the location of the expected node and the expected node is the destination node, transmitting a message from the computing device over a wireless computer communications network to a remotely disposed computing client indicating a completion of the routing of the shipping container to the destination node.

15. The computer program product of claim 14, wherein the method further includes, including in the message indicating the completion of the routing, a list of each node through which the container had passed from the origin node to the destination node and an amount of time during which the container had been present at each of the nodes in the log.

* * * * *